United States Patent [19]

Yoshida

[11] Patent Number: 4,553,102
[45] Date of Patent: Nov. 12, 1985

[54] MULTILEVEL AMPLITUDE MODULATION DEMODULATOR WITH DC DRIFT COMPENSATION

[75] Inventor: Yasuharu Yoshida, Tokyo, Japan

[73] Assignee: NEC Corp., Tokyo, Japan

[21] Appl. No.: 633,315

[22] Filed: Jul. 23, 1984

[30] Foreign Application Priority Data

Jul. 22, 1983 [JP] Japan .................................. 58-134119
Jul. 22, 1983 [JP] Japan .................................. 58-134120

[51] Int. Cl.$^4$ ............................................. H03D 1/06
[52] U.S. Cl. ..................................... 329/133; 329/146; 329/166; 329/167; 329/168; 455/309; 455/312
[58] Field of Search ................ 329/50, 112, 122, 124, 329/126, 131, 132, 133, 134, 135, 146, 166, 167, 168, 169; 455/309, 312, 337

[56] References Cited

U.S. PATENT DOCUMENTS 3,688,205  8/1972  Burger ................................ 329/132
4,071,829  1/1978  Davis et al. ........................ 329/122
4,250,458  2/1981  Richmond et al. .............. 329/133 X Primary Examiner—Siegfried H. Grimm
Attorney, Agent, or Firm—Sughrue, Mion, Zinn, Macpeak & Seas

[57] ABSTRACT

Multilevel baseband signals are applied to a full-wave rectifying section which produces first and second outputs. These outputs are applied to an analog-to-digital converting means which produces a plurality of recovered binary digital signals and an error signal. A controller is supplied with at least one recovered binary digital signal and the error signal, and produces two control signals which are fed to the full-wave rectifying section to compensate (a) first DC-drifts superimposed on the multilevel baseband signal and (b) second DC-drifts generated within the full-wave rectifying section itself.

11 Claims, 12 Drawing Figures

MULTILEVEL AMPLITUDE MODULATION DEMODULATOR WITH DC DRIFT COMPENSATION

BACKGROUND OF THE INVENTION

1. Field of The Invention

The present invention relates to a demodulator for a multilevel amplitude modulation system, and more specifically to a demodulator for recovering a plurality of binary digital data from amplitude-modulated multilevel signals, and still more specifically to such a kind of demodulator which features effective compensation for undesired direct current drifts.

2. Description of the Prior Art

In order to increase the frequency spectrum efficiency in transmitting a digital signal by modulating a microwave carrier therewith, the multilevel (e.g. 16-level) QAM (quadrature amplitude modulation) system has proven to be effective.

In practice, however, the multilevel QAM system should be designed to meet strict requirements. One of the problems to be solved, is to compensate for direct current (DC) drifts of demodulated baseband signals which are applied to discriminators forming part of the demodulator.

A known approach to overcoming the DC-drifts of the demodulated baseband signals, has been disclosed in Japanese Patent Application No. 56-200047 (laid open under the publication No. 58-101449) in connection with a demodulator of the multilevel QAM system. According to this prior art, an error signal is derived from an analog-to-digital (A/D) converter which forms part of a discriminator and which is adapted to discriminate and recover the demodulated multilevel baseband signals. The error signal is fed back, via a DC voltage control loop, to a DC control circuit which precedes the A/D converter. The DC control circuit is responsive to the error signal and controls DC voltage components which are superimposed on the multilevel baseband signals, and thus compensates for the DC-drifts of the demodulated baseband signals.

On the other hand, in an effort to realize an improved demodulator of the multilevel QAM system, which features a simpler circuit configuration and low manufacturing cost, a demodulator (more precisely, a discriminator) utilizing a full-wave rectifier has been proposed. This full-wave rectifier is provided in front of an A/D converter and rectifies input signals with respect to zero voltage, so that the number of discriminating values is reduced by half and hence the the A/D converter is simplified or the number of the overall A/D converters involved in the discriminator can be reduced. This type of discriminator, however, is subject to DC-drifts within itself, viz., in an amplifier following the full-wave rectifier. These internally produced DC-drifts cannot be compensated for by the use of the control system as previously mentioned in connection with Japanese Patent Application No. 56-200047, in that this control system eliminates only the DC-drifts of the incoming baseband signals. In other words, desired circuit operation cannot be achieved only by the application of the known control system to the full-wave rectifier type demodulator or discriminator.

Hereinlater, the DC-drift superimposed on the baseband signal will be referred to as a first DC-drift, and that produced within the discriminator will be referred to as a second DC-drift.

SUMMARY OF THE INVENTION

The object of the present invention is therefore to provide a demodulator of the multilevel QAM system which is free from the above-mentioned first and second DC-drifts.

In brief these objects are fullfilled by a demodulator wherein multilevel baseband signals are applied to a full-wave rectifying section which produces a first and second outputs. These outputs are applied to an analog-to-digital converting means which produces a plurality of recovered binary digital signals and an error signal. A controller is supplied with at least one recovered binary digital signal and the error signal, and produces two control signals which are fed to the full-wave rectifying section to compensate (a) first DC-drifts superimposed on the multilevel baseband signal and (b) second DC-drifts generated within the full-wave rectifying section itself.

More specifically, a first aspect of the present invention takes a form of a demodulator for a multilevel amplitude modulation system, the demodulator comprising a discriminator which receives demodulated multilevel baseband signals and recovers a plurality of binary digital signals according to a plurality of discriminating levels, the discriminator including: a full-wave rectifying section which receives the multilevel baseband signals and produces first and second outputs, the first output being controlled by a first control signal with respect to the DC components thereof, the second output being full-wave rectified and controlled by a second control signal with respect to the DC components thereof; an analog-to-digital converting means which receives the first and second outputs and produces the recovered binary digital signals and an error signal; and a controller which receives at least one of the recovered binary digital signals and the error signal and which produces the first and second control signals after logic operations.

BRIEF DESCRIPTION OF THE DRAWINGS

The features and advantages of the present invention will become more clearly appreciated from the following description taken in conjunction with the accompanying drawings in which like blocks, circuits or circuit elements are denoted by like reference numerals and in which.

DETAILED DESCRIPTION OF THE PREFERRED EMBODIMENTS

Prior to the detailed description of the present invention, a known demodulator of the multilevel QAM system will be discussed with reference to FIGS. 1 and 2.

Figure 1:
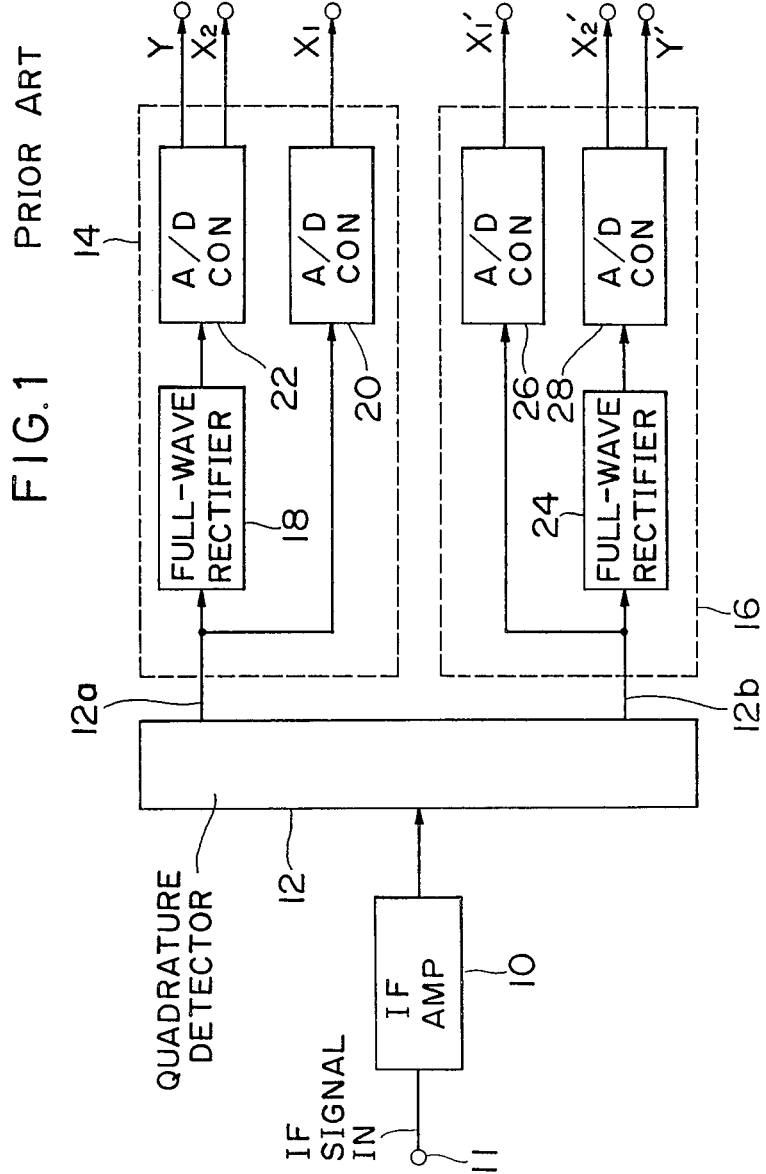
FIG. 1 shows in block diagram form a known demodulator for 16-level QAM system.

FIG. 1 shows, in block diagram form, a conventional 16-level QAM demodulator. As shown, the FIG. 1 arrangement includes an IF (Intermediate Frequency) amplifier 10 which receives an IF signal via a terminal 11 and which has an automatic gain control function, a quadrature detector 12 which receives the output of the amplifier 10 to produce two 4-level baseband signals 12a and 12b, and two discriminators 14 and 16.

The discriminator 14 includes a full-wave rectifier 18 adapted to full-wave rectify the 4-level baseband signal 12a applied thereto, a 1-bit A/D converter 20 which outputs a recovered binary digital signal X1, and a 2-bit A/D converter 22 which outputs a recovered binary digital signal X2 and an error signal Y. The other discriminator 16, which is essentially the same as the discriminator 14, includes counterparts 24, 26 and 28 and produces corresponding binary digital signals X1' and X2' and an error signal Y'. Consequently, only the discriminator 14 will be discussed for the sake of simplicity.

Figure 2:
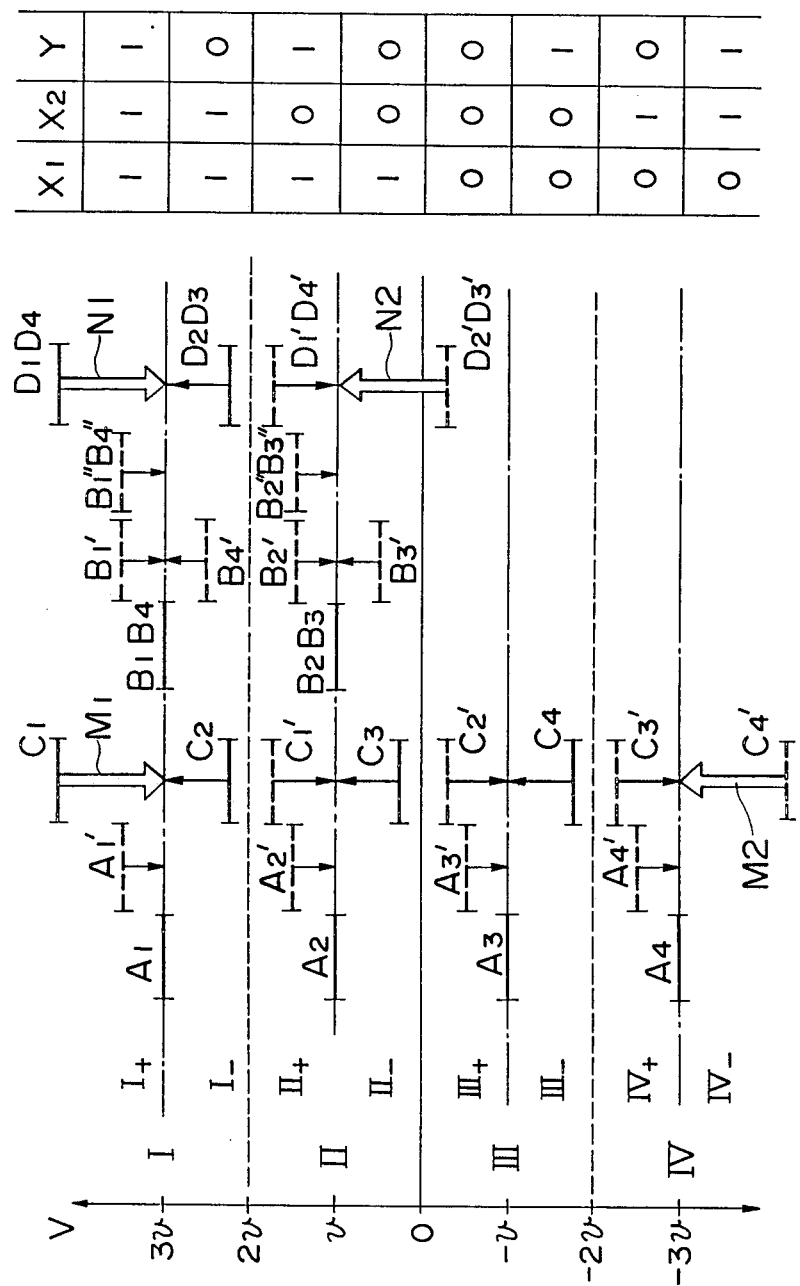
FIG. 2 is a chart showing possible levels of demodulated multilevel baseband signals with respect to discriminating regions of A/D converters, which is utilized for describing the operations of the discriminators of the FIG. 1 arrangement and the embodiments of the present invention.

FIG. 2 is a chart showing possible levels of demodulated multiple baseband signals with respect to the discriminating regions of the A/D converters 20 and 22, with which the operation of the discriminator 14 (FIG. 1) will be described. FIG. 2 will be referred to again when discussing the operation of the present invention.

As shown in FIG. 2, the discriminating regions are divided into four major regions I, II, III and IV according to three reference voltages 0 v and ±2 v. Each of these regions I, II, III and IV are subdivided into two error regions denoted by suffixes "+" and "−", whereby a total of eight error regions I+, I−, II+, II−, III+, III−, IV+ and IV− are defined as shown. The 1-bit A/D converter 20 discriminates and recovers one of the 4 possible levels of the baseband signal 12a according to the reference voltage 0 v (viz., determines whether it is positive or negative), and thence generates the output, viz., the recovered binary digital signal X1. The output X1 assumes a logic "1" where the level of the applied baseband is positive and assumes a logic "0" where it is negative. On the other hand, the 2-bit A/D converter 22 receives the output of the full-wave rectifier 18, and discriminates the full-wave rectified signal with respect to the reference voltage 2 v such that X2 assumes a logic "1" where the level of the full-wave rectified signal is more that 2 v and assumes a logic "0" where the level does not reach 2 v. It should be noted that the output X2 assumes a logic "1" where the level of the baseband signal 12a is exceeds −2 v. This is because a level in excess of −2 v is greater than +2 v after the full-wave rectification. Further, the error signal Y assumes a logic "1" where the voltage level to be recovered is positioned in the regions I+, II+, III− and IV−, while the error signal Y assumes a logic "0" where the level is located in the regions I−, II−, III+ and IV+. It is therefore understood that the combination of X1, X2 and Y determines in which discriminating region the actual level of the baseband signal 12a is positioned.

In FIG. 2, the four possible levels of the baseband signal 12a are denoted by A1 through A4, wherein it is assumed that the baseband signal is not DC-drifted. These possible levels A1 through A4 are full-wave rectified in the rectifier 18 which outputs corresponding four possible levels B1 through B4. On the contrary, assuming that the possible levels A1 through A4 are DC-drifted as shown by A1' through A4', then the output of the full-wave rectifier 18 takes one of the corresponding possible levels shown by B1' through B4', in which it is assumed that the aforementioned first DC-drift compensation is not implemented. It goes without saying that when the first DC-drifts of the possible levels A1' through A4' are correctly compensated for, the output of the full-wave rectifier 18 assumes one of the corresponding possible levels B1 through B4. However, the normal levels B1 through B4 are liable to be DC-drifted (shown by B1" through B4") in the amplifier following the rectifier 18 (e.g. a DC amplifier provided in the A/D converter 20), as referred to previously as the second DC-drift. Although the first DC-drifts can be eliminated by the control loop disclosed in Japanese Patent Application No. 56-200047, the second DC-drift cannot be compensated for. As a consequence, it is necessary to shift the output of the full-wave rectifier 18 in the opposite direction to that of the second DC-drift in order to compensate for the second DC-drift. The present invention is therefore directed to an improved demodulator of the multilevel QAM system wherein both the first and second DC-drifts are effectively eliminated.

Figure 3:
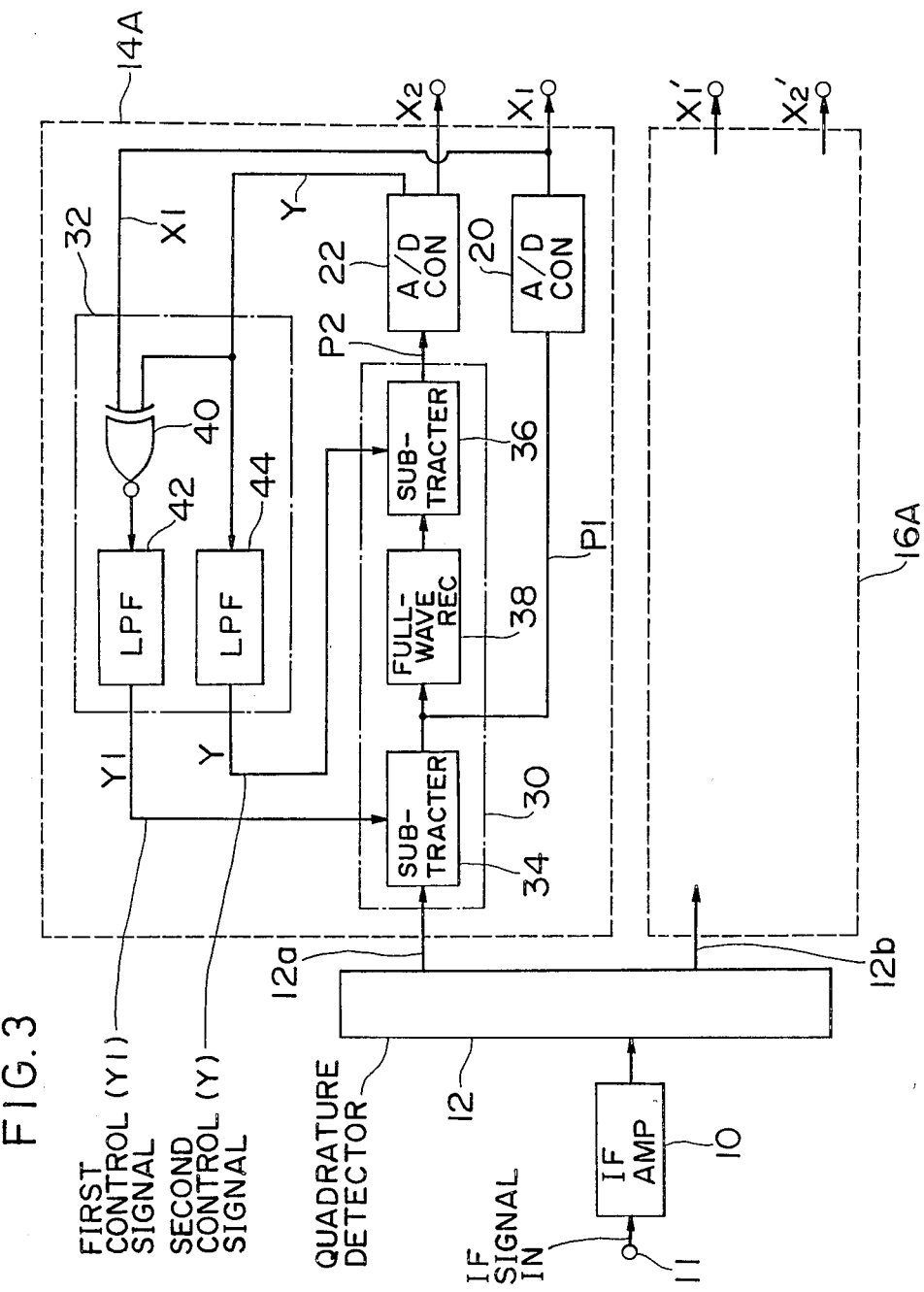
FIG. 3 shows in block diagram form a first embodiment of the present invention.

Reference is now made to FIG. 3, wherein there is shown, in block diagram form, a first embodiment of the present invention which takes a form of a demodulator for a 16-level QAM system.

The FIG. 3 arrangement includes two discriminators 14A and 16A. Other blocks, viz. the IF amplifier 10 and the quadrature detector 12 have been referred to with reference to FIG. 1. Each of the discriminators 14A and 16A is identical in arrangement, so that only the former discriminator 14A will be discussed for simplicity. The latter mentioned discriminator 16A is not shown in detail.

The discriminator 14A includes a full-wave rectifying section 30, a controller 32, in addition to the A/D converters 20 and 22 as mentioned already. The full-wave rectifying section 30 comprises two subtracters 34, 36 and a full-wave rectifier 38, which are coupled in series as shown. The controller 32 includes a coincident circuit 40 comprising an exclusive OR gate and an inverter, and two low-pass filters 42 and 44.

As shown, the A/D converter 20 is supplied with the output (denoted P1) of the subtracter 34 and produces the recovered digital signal X1, while the other A/D converter 22 receives the output (denoted P2) of the subtracter 36 and produces the recovered digital signal X2 and the error signal Y. The coincident circuit 40 receives the signals X1 and Y and applies a first control signal Y1 to the subtracter 34 via the low-pass filter 42. The error signal Y is applied to the subtracter 36 as a second control signal via the low-pass filter 44. The first control signal Y1 controls the first DC-drifts of the incoming baseband signal 12a, while the second control signal (error signal) Y is used to control the second DC-drifts which are produced in a DC amplifier (not shown) provided in the stage following the rectifier 38, viz., the A/D converter 22 in this instant.

The operation of the discriminator 14A of FIG. 3 will be described in more detail with reference to the following Table 1 which lists the logic values of the signals X, Y and Y1 with respect to the error regions.

TABLE 1

|    | I+ | I− | II+ | II− | III+ | III− | IV+ | IV− |
|----|----|----|-----|-----|------|------|-----|-----|
| X1 | 1  | 1  | 1   | 1   | 0    | 0    | 0   | 0   |
| Y  | 1  | 0  | 1   | 0   | 0    | 1    | 0   | 1   |
| Y1 | 1  | 0  | 1   | 0   | 1    | 0    | 1   | 0   |

In the case the baseband signal is DC-drifted as shown by A1', A2', A3' or A4' (FIG. 2) which are positioned in the error regions I+, II+, III+ and IV+ respectively, the second control signal Y1 assumes a logic "1". If the logic "1" of the first control signal Y1 is predetermined to shift the level of the baseband signal in the direction shown by the small solid line arrows, each of these shifted levels can be restored to the normal level (i.e., the level of A1, A2, A3 or A4). To the contrary, if the four possible levels of the baseband signal A1 through A4 are DC-drifted below to be positioned in the error regions I−, II−, III− and IV−, respectively, then the first control signal Y1 assumes a logic "0" in order to shift the levels upwardly (in the drawing), thereby restoring the shifted levels to their normal ones (i.e., the level of A1, A2, A3 or A4).

In order to compensate for the second DC-drift, the error signal (second control signal) Y is applied to the subtracter 36. If the logics "1" and "0" of the error signal Y are respectively predetermined to shift, downwardly and upwardly, the level of the output of the full-wave rectifier 38, then a deviated level is restored to the normal level. In FIG. 2, there is shown a case where the full-wave rectified levels are shifted upwardly with respect to their normal levels (viz., B1" through B4"). In this case, the error signal Y assumes a logic "1" and hence the levels B1" through B4" can be restored to the corresponding normal levels.

As previously described, the first embodiment shown in FIG. 3 utilizes the error signal (first control signal) Y1 to compensate for the first DC-drift. Consequently, if the possible levels of the baseband signal are deviated to excessively deviated levels C1, C2, C3 and C4, then the error signal Y1 takes logics "1", "0", "0" and "0", respectively. This means that the error signal Y1 indicates only a correct control with respect to the level C1 which can be restored in the direction indicated by an arrow M1, and does not indicate correct controls regarding the other levels C2 through C4. Consequently, the erroneous control information prevails and hence the drifted levels C2, C3 and C4 are incorrectly shifted to A1, A2 and A3, respectively, as shown by large solid line arrows. This applies to the other case where the first DC-drifts are directed to the opposite direction, as shown by C1' through C4'. In this case, only the level C4' can be restored to the normal level A4 as shown by an arrow M2.

Further, the above discussion is applicable to the exessive second DC-drifts (D1 through D4) wherein only the levels D1 and D4 can be compensated in the direction shown by an arrow N1, and also applicable to the other exessive second DC-drift (D1' through D") wherein only the levels D2' and D3' can be compensated in the direction shown by an arrow N2. Hereinafter, the above-mentioned incorrect shifting of the levels may be referred to as a false pull-in.

Although such large DC-drifts normally do not take place, but may be induced depending, on initial conditions of the demodulator when the signal is initially applied. It is therefore necessary to compensate for these undesired circuit operations.

It is assumed that the above-mentioned false pull-in takes place as follows. When the incoming IF signal terminates and the baseband signal 12a assumes approximately zero voltage, the first control signal Y1 does not assume a corresponding zero value and is superimposed on the output signal P1 of the subtracter 34 so that the signal P1 is biased toward one of the levels A2 or A3. Thereafter, the output P1 fluctuates slightly with respect to this level. When the output P1 rises above the level A2 or falls below the level A3, the four levels of the baseband signal which are symmetrical with respect to zero voltage, tend to be biased toward the excessive levels C1 through C4 or C1' through C4'. On the other hand if the baseband signal 12a is itself DC-shifted and is applied to the subtracter 34, then the aforementioned phenomenon also takes place. Consequently, one of the methods for preventing the false pull-in is to limit the DC level of the first control signal Y1 such that the output 35 does not reach the level A2 or A3.

Figure 4:
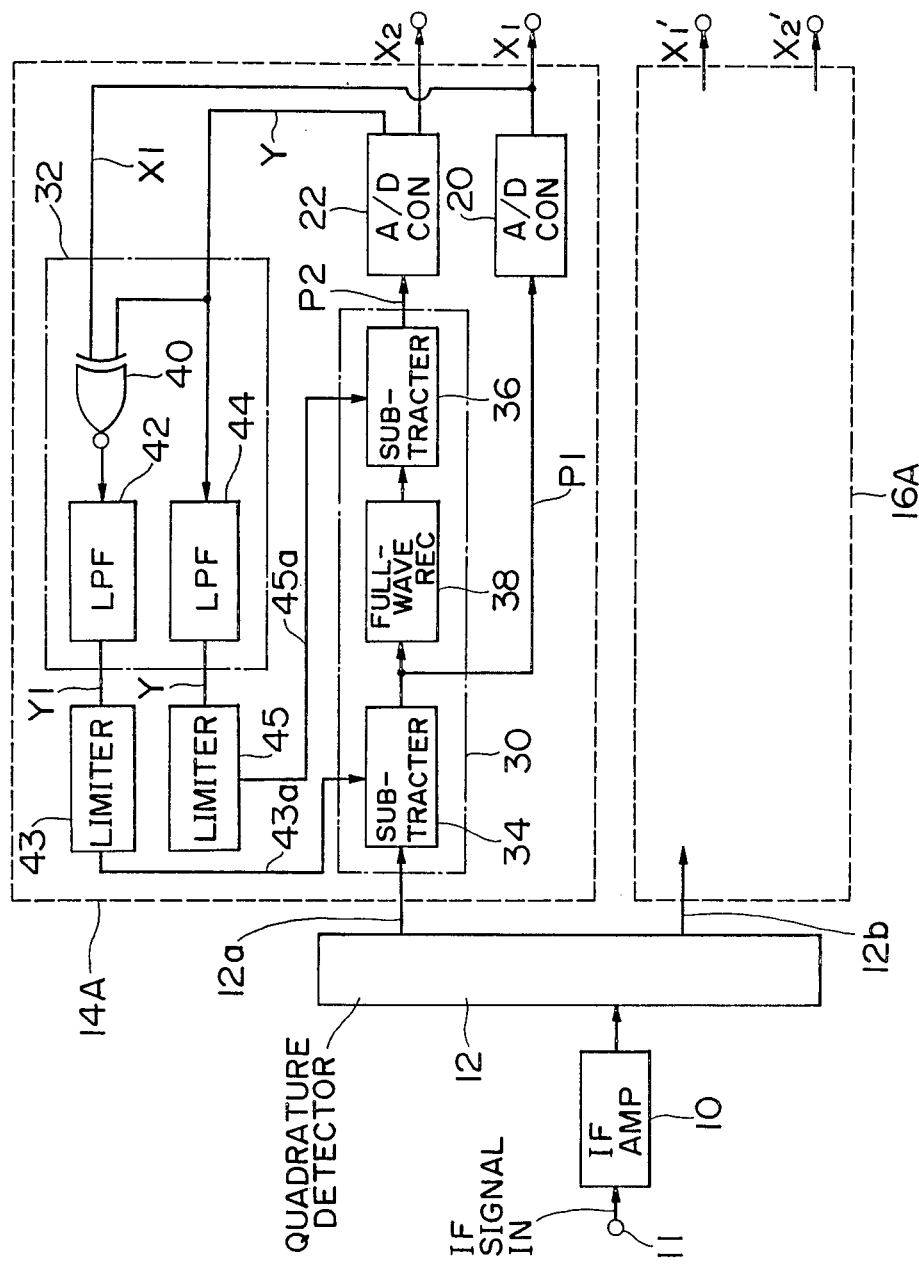
FIG. 4 shows in block diagram form a second embodiment of the present invention.

FIG. 4 shows, in block diagram form, a demodulator which is a second embodiment of the present invention and which is arranged to execute the above-mentioned limiting function (the false pull-in) by providing two limiters. The circuit arrangement of FIG. 4 is the same as that of FIG. 3 except that the former arrangment is provided with additional limiters 43 and 45. Since the other blocks of FIG. 4 except for the limiters 43 and 45 have been described, discussions will only be made with respect to the limiters 43 and 45 and the blocks relevant thereto.

The limiter 43 limits the first control signal Y1 within a range of $\pm L$, while the limiter 45 limits the control signal Y within a range $\pm L'$, wherein $L' < L$ and $(L+L') < v$ (= one error range). The ranges L and L' will be referred to again with reference to FIG. 5. As a consequence, the output P1 of the subtacter 34 is limited within $\pm L$ if the baseband signal 12a becomes zero, so that there is no possibility that the excessive levels C1 through C4 or C1' through C4' can be reached.

Figure 5:
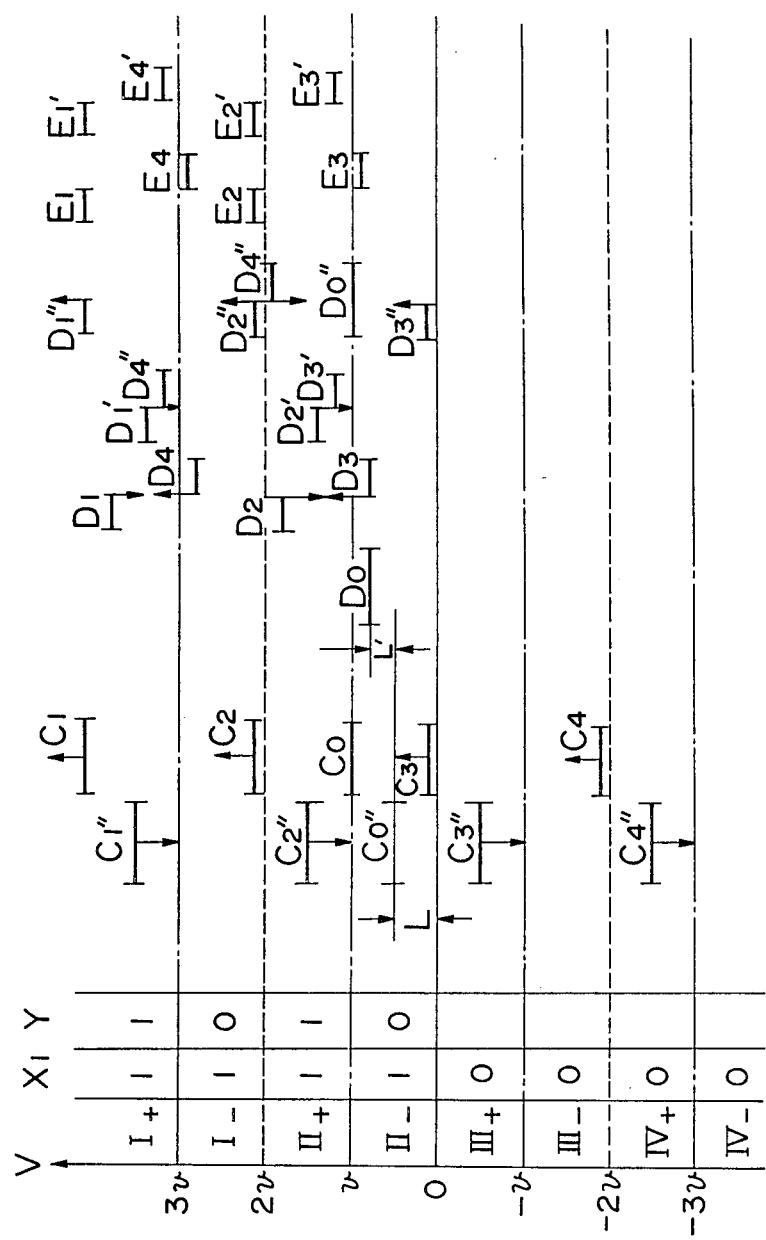
FIG. 5 is a chart showing possible levels of multilevel baseband signals with respect to discriminating regions, with which the FIG. 4 arrangement is described.

The operation of the limiters 43 and 45 of FIG. 4 will be described in detail with reference to FIG. 5. In FIG. 5, C0" denotes the level of the output 43a of the limiter 43, while D0 denotes the level of the output 45a of the limter 45, both under the condition that the baseband signal 12a is not applied. Under these states, if the baseband signal with no DC components is applied, the possible levels of the output signal P1 assume the levels denoted by C1" through C4", while those of the output signal P2 are denoted by D1 through D4. In this case, the control signals Y1 and Y assume the logic levels listed in Table 2(a). As seen from Table 2(a), the control signal Y1 assumes a logic "1" with respect to C1"

through C4", while the second control signal Y asumes logics "1", "0", "1" and "0" with respect to the error ranges I+, I−, II+ and II− respectively as shown in FIG. 5, so that C1" through C4" and D1 through D4 are shifted in the direction shown by associated solid line arrows. According to this control, if the shifted levels D1' and D4' are in the same region, and also if D2' and D3' are located in the same region, then the control signal Y assumes a logic "1" with respect to C1" through C4" as shown in Table 2(b). Consequently, the output P2 is shifted to the negative direction. These operations are repeated until the normal states are reached.

TABLE 2

|  | (a) | | | (b) | | |
|---|---|---|---|---|---|---|
|  | X1 | Y | Y1 | X1 | Y | Y1 |
| C1" | 1 | 1 | 1 | C1" | 1 | 1 | 1 |
| C2" | 1 | 1 | 1 | C2" | 1 | 1 | 1 |
| C3" | 0 | 0 | 1 | C3" | 0 | 1 | 0 |
| C4" | 0 | 0 | 1 | C4" | 0 | 1 | 0 |

Assuming that (1) the DC-drift at the input of the demodulator is M± (inclusive of the DC components of the baseband signal), (2) the DC-drift in the A/D converter is ±M'. If $(L+L'+M+M')<v$, then there is no initial state which may cause the false pull-in. Since M and M' should be compensated by the subtracters 34 and 36 in normal operations, it is necessary that $M < L$ and $M' < L'$. Consequently, each of M and M' is less that one half of the error range (v). However, this does not cause a problem if the error range (v) can be set to meet the above conditions.

In the FIG. 4 arrangement, let consider the case where the limiter 45 is omitted. If the output signal P1 of the subtracter 34 assumes CO", then the output signal P2 of the subtracter 36 assumes DO" (see FIG. 5). Under these conditions, when the baseband signal is applied, the subtracter 34 produces levels E1 through E4 or E1' through E4', with respect to C1" through C4" of the output signal P1. The logic levels of X1, X2 and Y in this case are listed in Table 3(a) or (b). As shown, one of the control signals Y and Y1 assumes a logic "1" more that a logic "0", so that the shifted levels are liable to be correctly comenpensated. However, as shown, the other of Y and Y1 assumes a logic "0" more than a logic "1", so that erroneous DC-drift compensations occur. Consequently, in the case where the correct DC-drift compensation is implemented through a control loop with quicker response, this compensation is carried out according to Table 2(a) or (b). Contrarily, in case the correct DC-shift compensation is performed through a control loop with slow response, then the control according to Table 3(a) is replaced by the control according to Table 3(b), and vice versa. Thereafter, the deviated levels are restored to the corresponding normal levels. It is understood that even if the limiter 45 is omitted, the false pull-in can be compensated although the time duration required for the pull-in increases.

TABLE 3

|  | (a) | | | (b) | | |
|---|---|---|---|---|---|---|
|  | X1 | Y | Y1 | X1 | Y | Y1 |
| C1" | 1 | 1 | 1 | C1" | 1 | 1 | 1 |
| C2" | 1 | 0 | 0 | C2" | 1 | 0 | 0 |
| C3" | 0 | 0 | 1 | C3" | 0 | 1 | 0 |
| C4" | 0 | 0 | 1 | C4" | 0 | 1 | 0 |

Figure 6:
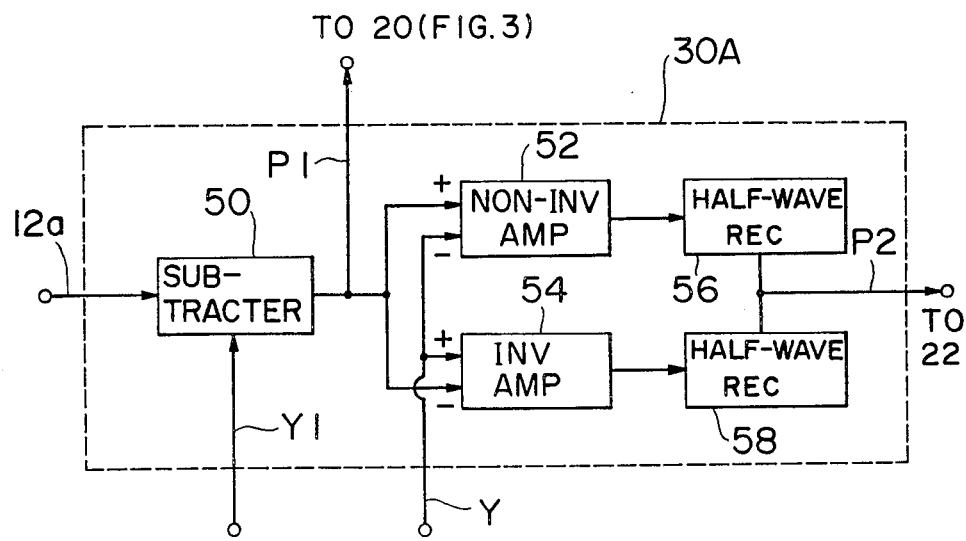
FIG. 6 shows in block diagram form another full-wave rectifying section of the present invention.

Referring to FIG. 6, wherein there is shown a full-wave rectifying section 30A which has a function similar to the section 30 (FIG. 3). The FIG. 6 arrangement 30A comprises a subtracter 50, a differential amplifier of non-inverting type 52, another differential amplifier of inverting type 54, two half-wave rectifiers 56 and 58 which function as a full-wave rectifier in combination. The amplifiers 52 and 54 are identical in configuration. The subtracter 50 compensates the incoming baseband signal 12a under the control of the first control signal Y1, the manner of which is the same as described hereinbefore. The output of the subtracter 50 is applied to the A/D converter 20 (FIG. 3), and is further applied to the non-inverting input terminal of the amplifier 52 and the inverting input terminal of the amplifier 54. The second control signal Y is applied to the amplifiers 52 and 54 as shown in order to control the reference voltages thereof, thereby compensating for the second DC-drift which, as mentioned previously, occurs within the A/D converter 22 (FIG. 3).

Figure 7:
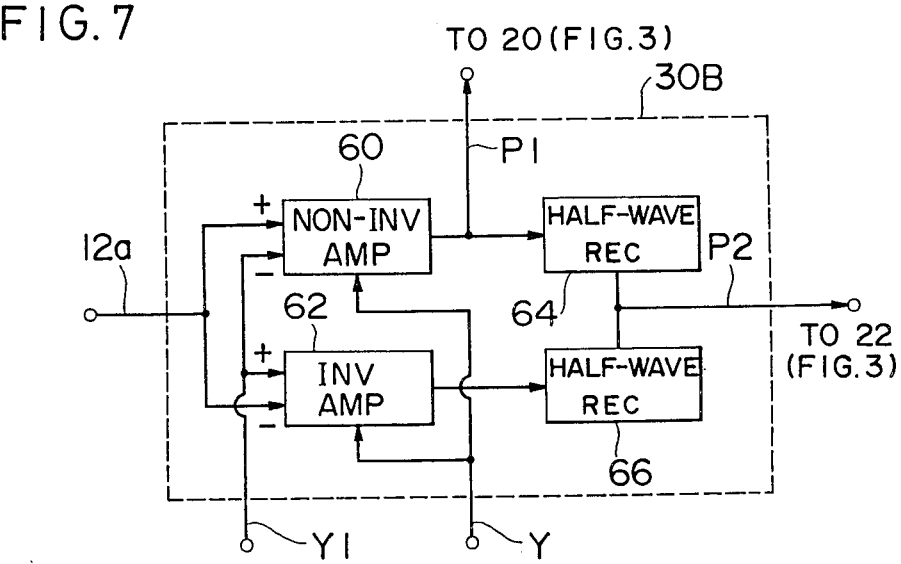
FIG. 7 shows in block diagram form still another full-wave rectifying section of the present invention.

Reference is now made to FIG. 7, wherein there is shown a full-wave rectifying section 30B which has the same function as the section 30 (FIG. 3). The section 30B shown in FIG. 7 includes a differential amplifier of non-inverting type 60, a second differential amplifier of inverting type 62, two half-wave rectifiers 64 and 66 which operate in combination as a full-wave rectifier. The arrangement of FIG. 7 is similar to that of FIG. 6, so that only the difference therebetween will be described for simplicity. In FIG. 7, the first control signal Y1 is applied to the amplifiers 60 and 62 to compensate for the first DC-drift by controlling the corresponding reference voltages thereof. On the other hand, the second control signal Y controls the current of a constant current circuit provided in each of the differential amplifiers 60 and 62, whereby the second DC-drift can be compensated for.

Figure 8:
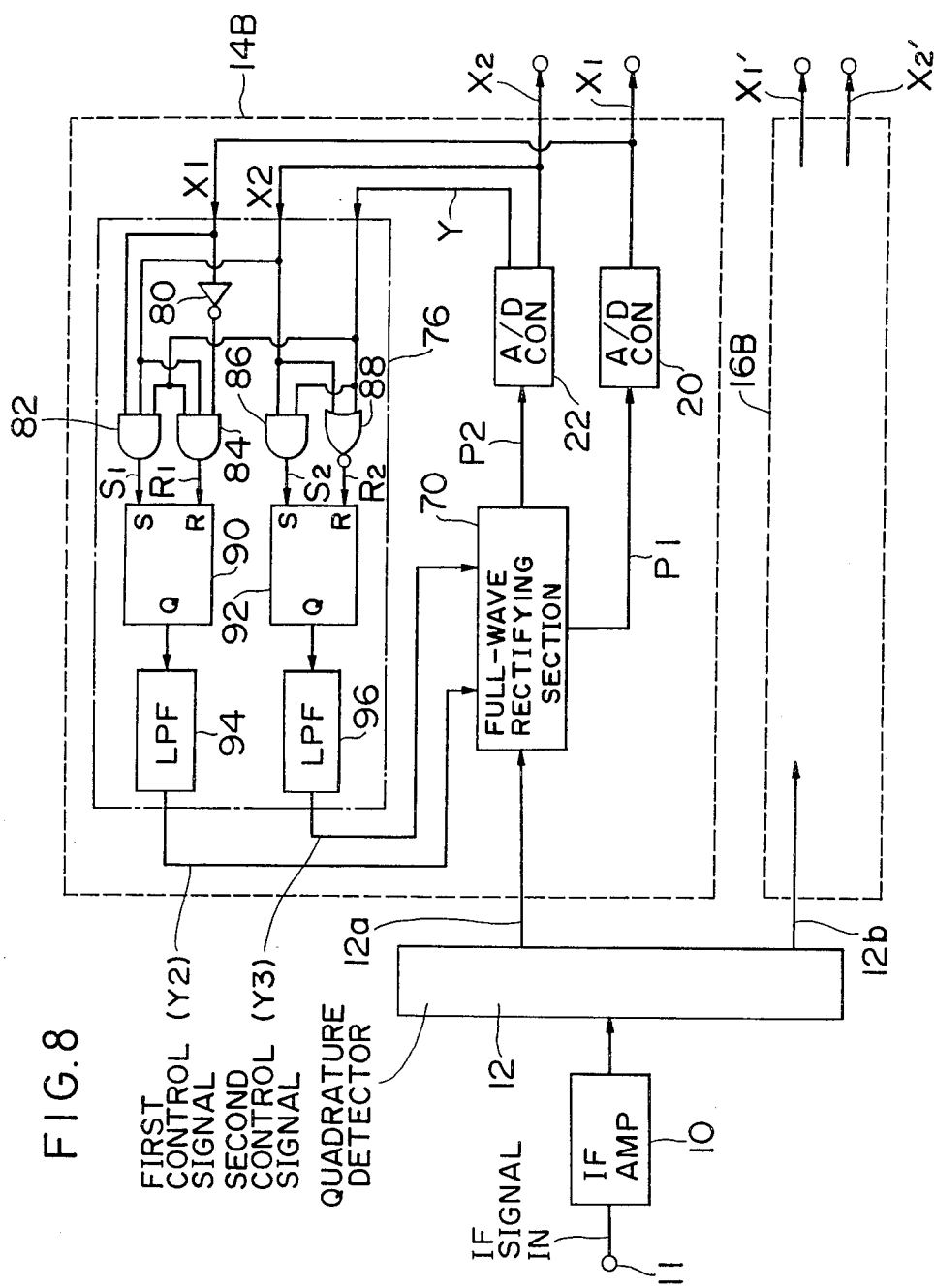
FIG. 8 shows in block diagram form a third embodiment of the present invention.

In FIG. 8, a third embodiment of the present invention is shown in block diagram form. This embodiment features an effective DC-drift compensation where the drift exceeds one error range, as shown by C1 through C4, C1' through C4', D1 through D4, or, D1' through D4' (FIG. 2).

As shown, the FIG. 8 arrangement includes two discriminators 14B and 16B, the IF amplifier 10 and the quadrature detector 12, wherein the last two blocks have been described with reference to FIG. 3. The arrangement of the discriminator 16B is not shown in that it is essentially the same as the discriminator 14B.

The discriminator 14B generally comprises a full-wave rectifying section 70, the 1-bit A/D converter 20, the 2-bit A/D converter 22, and a controller 76. The section 70 functions in the same manner as the aforementioned full-wave rectifying section 30, 30A or 30B, and hence any of these sections 30, 30A and 30B can be applied to the section 70. The controller 76 includes an inverter 80, three AND gates 82, 84 and 86, a NOR gate 88, two flip-flops 90 and 92, two low-pass filters 94 and 96, all of which are coupled as shown. The flip-flop 90 is set by the output of the AND gate 82 (S1), and reset by the output of the AND gate 84 (R1). Similarly, the flip-flop 92 is set by the output of the AND gate 86 (S2), and reset by the output of the NOR gate 88 (R2). The outputs of the flip-flops 90 and 92 are utilized as a first and second control signals Y2 and Y3. The following Table 4 lists the outputs S1, R1, S2 and R2 with respect to the error regions I+ through IV−.

TABLE 4

|    | I+ | I− | II+ | II− | III+ | III− | IV+ | IV− |
|----|----|----|-----|-----|------|------|-----|-----|
| S1 | 1  | 0  | 0   | 0   | 0    | 0    | 0   | 0   |
| R1 | 0  | 0  | 0   | 0   | 0    | 0    | 0   | 1   |
| S2 | 1  | 0  | 0   | 0   | —    | —    | —   | —   |
| R2 | 0  | 0  | 0   | 1   | —    | —    | —   | —   |

It is understood from Table 4 that (a) the first control signal Y2 is maintained a logic "1" once the baseband signal assumes the level positioned in the error region I+, (b) the first control signal Y2 is maintained a logic "0" once the baseband signal assumes the level positioned in the error region IV−, (c) the second control signal Y3 is maintained a logic "1" once the baseband signal assumes the level positioned in the error region I+, and (d) the second control signal Y3 is maintained a logic "0" once the baseband signal assumes the level positioned in the error region II−. More specifically, the levels C1 through C4 are compensated by the case (a), the levels C1' through C4' by the case (b), the levels D1 through D4 by the case (c), and the levels D1' through D4' by the case (d).

A method similar to that set forth above has been disclosed by Japanese Patent Application No. 58-48249 which, however, is directed to a discriminator having therein no full-wave rectifier.

Figure 9:
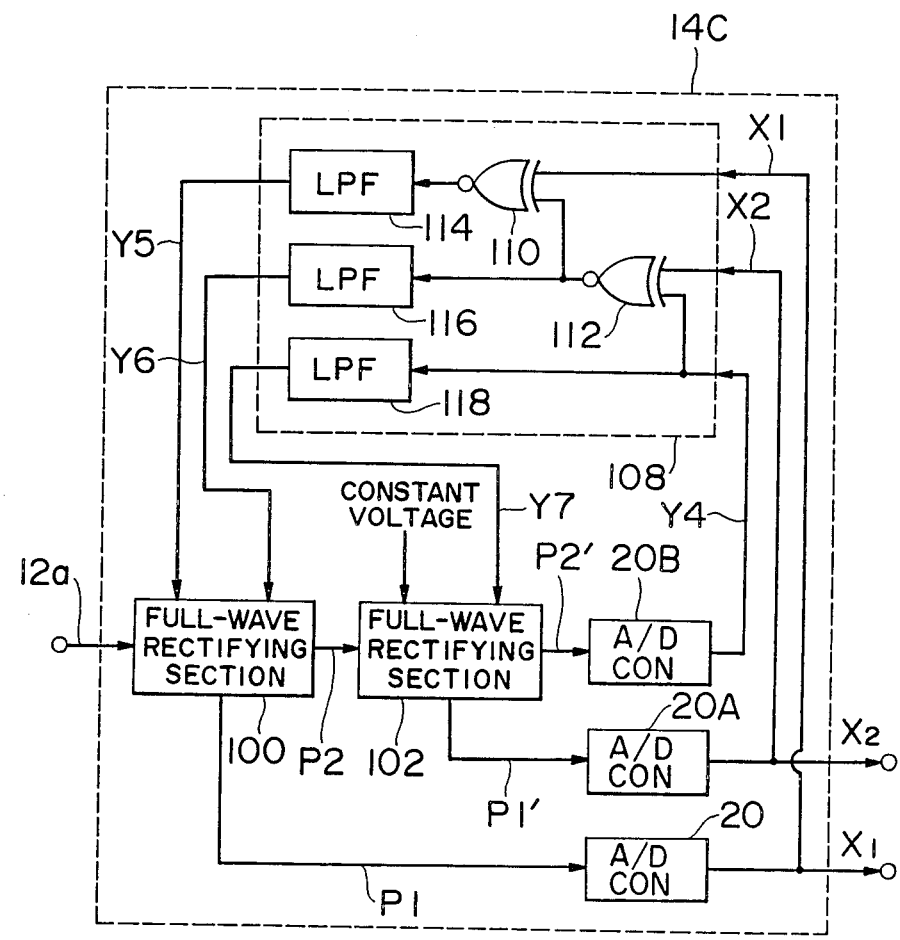
FIG. 9 shows in block diagram form a fourth embodiment of the present invention.

Referring now to FIG. 9, wherein there is shown a fourth embodiment of the present invention. In FIG. 9, some blocks are omitted for the sake of simplicity: the IF amplifier 10, the quadrature detector 12 and a discriminator which is essentially the same arrangement as a discriminator 14C shown in the drawing.

The discriminator 14C comprises two full-wave rectifying sections 100 and 102 coupled in series, the 1-bit A/D converter 20, two 1-bit A/D converters 20A and 20B, and a controller 108. The controller 108 includes two coincident circuits 110 and 112 and three low-pass filters 114, 116 and 118. The section 100 receives the baseband signal 12a, and outputs the non-rectified signal P1 and the signal P2 which is full-wave rectified with respect to the reference voltage 0 v. The section 102 is supplied with the signal P2 and produces a non-rectified signal P1' and a full-wave rectified signal P2'. The signal P1' is applied to the A/D converter 20A which outputs the signal X2. This signal X2 indicates whether the level of the signal P1' is in the region I or II. On the other hand, the A/D converter 20B receives the signal P2', and discriminates the same with respect to the reference voltage 3 v and thence produces an error signal Y4, which indicates as to whether the signal P2' is positioned in the error region I+ or I−. The following Table 5 shows the digital values, which the error signal Y4 assumes, with respect to the error regions I+ through IV−.

TABLE 5

|    | I+ | I− | II+ | II− | III+ | III− | IV+ | IV− |
|----|----|----|-----|-----|------|------|-----|-----|
| Y4 | 1  | 0  | 0   | 1   | 1    | 0    | 0   | 1   |

The controller 108 is supplied with the signals X1, X2 and Y4, and produces three control signals Y5, Y6 and Y7. The control signals Y5 and Y6, which are respectively identical with the previously disclosed signals Y1 and Y, are applied to the full-wave rectifying section 100. The control signal Y7, which is obtained by Y4, is applied to the section 102. As shown, the section 102 receives a constant voltage, which is utilized as a constant reference voltage of a subtracter (for example) provided in front of the full-wave rectifier (not shown) of the section 102. As previously mentioned, the control signals Y5 and Y6 (viz., Y1 and Y) can properly control the first and second DC-drifts, respectively. It is understood from the Table 5 that the control signal Y7 (viz., Y2) is able to compensate for the DC-drift after the signal has been full-wave rectified twice.

In FIG. 9, in the case where the section 30 shown in FIG. 3 is utilized as the sections 100 and 102, the following modifications are possible: (a) the control signals Y6 and Y7 can be interchanged so as to be applied to the sections 102 and 100, respectively, and (b) one of the subtracters can be omitted from either of the sections 100 and 102. Further, if the FIG. 9 arrangement is modified such that the signal P1' is applied to the A/D converter 20A via an AC (alternate current) coupling instead of the DC coupling, then the following advantages can be derived: (a) each of the A/D converters 20, 20A and 20B can be arranged to be identical, and (b) DC-level variations caused by generation frequency distribution of each level of the baseband signal, can be compensated for in the same manner as the above-mentioned DC-drifts.

Figure 10:
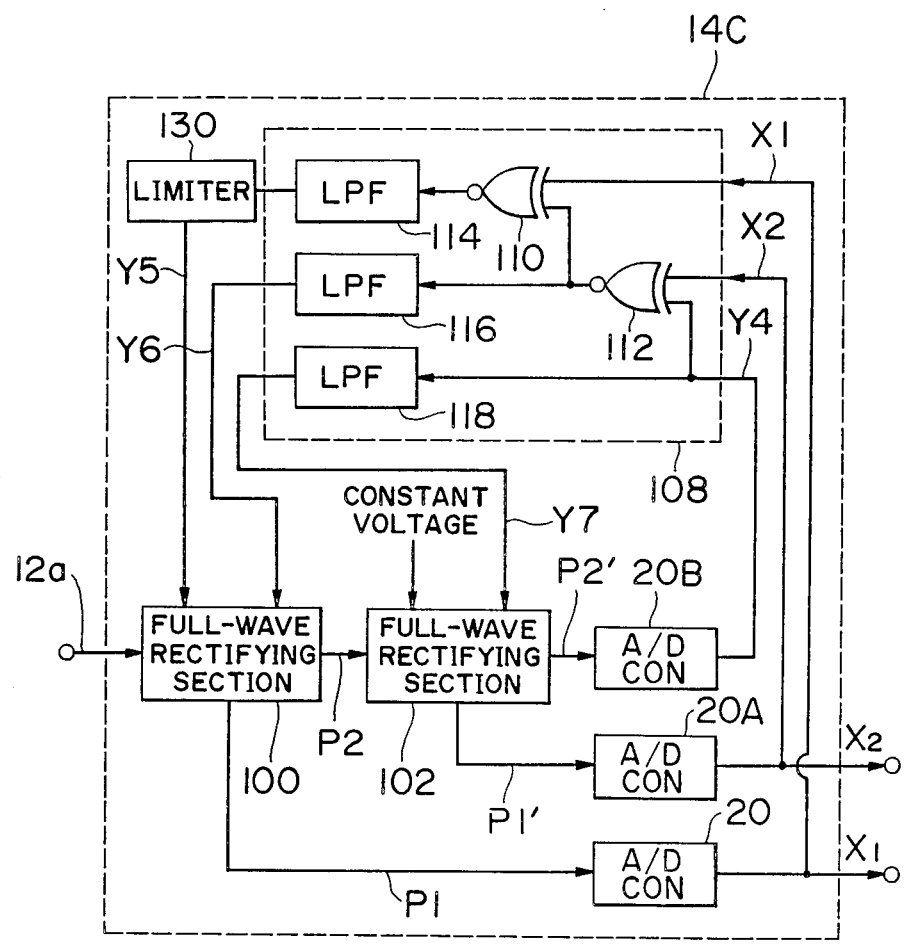
FIG. 10 shows in block diagram form a fifth embodiment of the present invention.

FIG. 10 shows, in block diagram form, a fifth embodiment of the present invention. The arrangement of FIG. 10 is the same as that of FIG. 9 except that the former arangement is provided with an additional limiter 130. The insertion of a limiter has been discussed in detail with reference to FIG. 8, so that further description thereof will be omitted for clarity. The limiter 130 is provided for effectively compensating for the excessive DC-drifts, which is understandable with ease in consideration of the discussion made with reference to FIG. 8.

Figure 11:
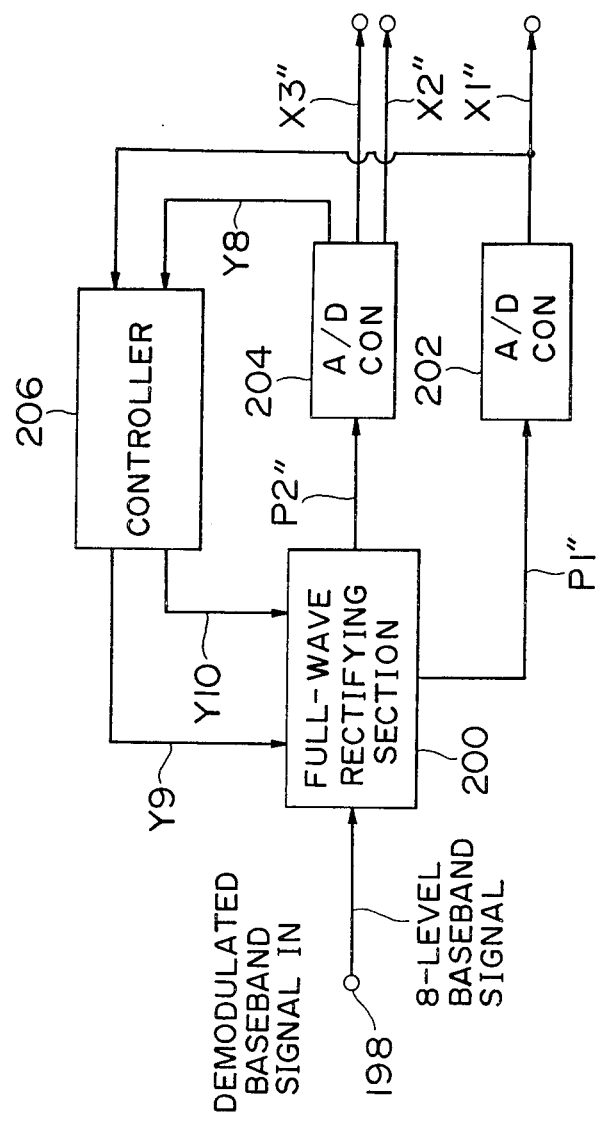
FIG. 11 shows in block diagram form a sixth embodiment of the present invention, which takes a form of a discriminator of a demodulator for 64-value QAM system.

Referring now to FIG. 11, wherein there is shown a sixth embodiment of the present invention. This embodiment is directed to a discriminator which forms part of a demodulator for 64-level QAM system. This discriminator recovers a plurality of binary digital data from 8-level baseband signals. In FIG. 11, 8-level baseband signal is applied, via an input terminal 198, to a full-wave rectifying section 200 which is identical in configuration with the counterpart 30 (FIG. 3). The section 200 applies two outputs P1" and P2" which are then recovered in a 1-bit A/D converter 202 and a 3-bit A/D converter 204, respectively. The A/D converter 202 outputs a binary digital signal X1", while the A/D converter 204 produces two binary digital signals X2", X3" and Y8. The signals X1" and Y8 are applied to a controller 206 which is the same as the controller 32 shown in FIG. 3. The controller 206 outputs two kinds of control signals Y9 and Y10 which are applied to the full-wave rectifying section 200. The operation of the FIG. 11 arrangement will be understood from the already mentioned embodiments of this invention, so that further discussion will be omitted.

Figure 12:
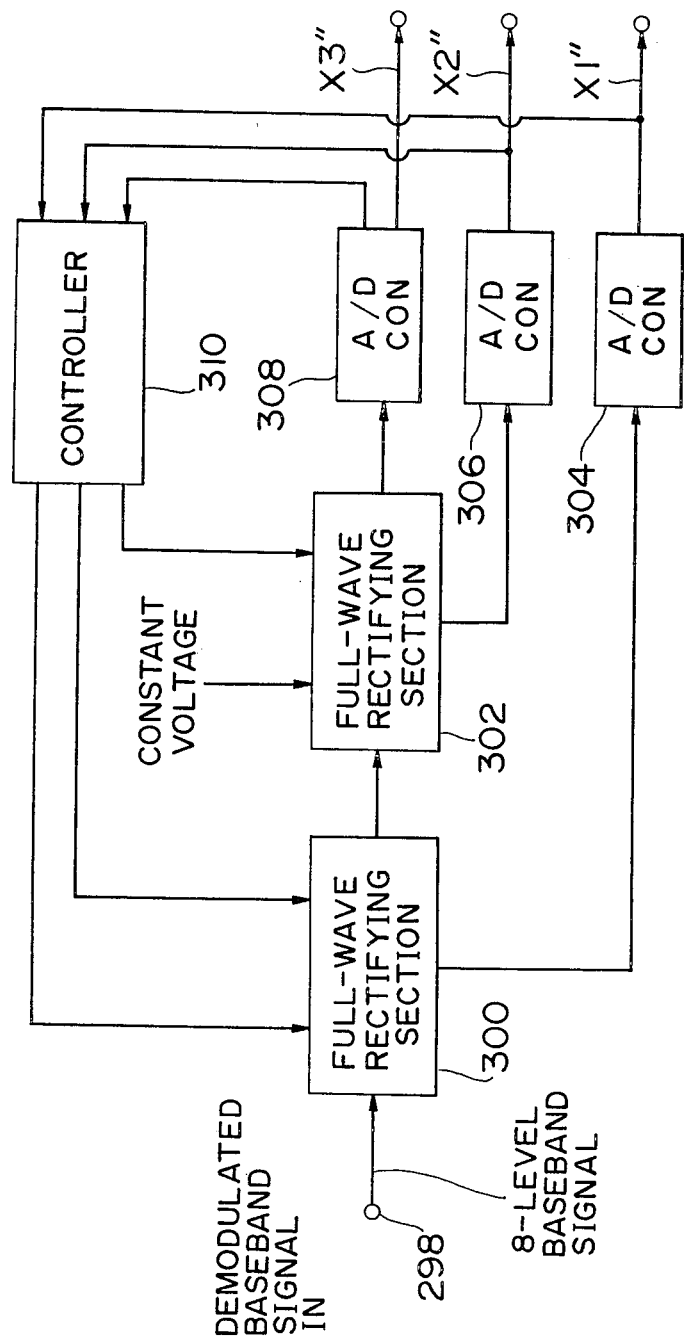
FIG. 12 shows in block diagram form a seventh embodiment of the present invention, which takes a form of a discriminator of a demodulator for 64-value QAM system.

FIG. 12 shows, in block diagram form, a seventh embodiment of the present invention. Like the fifth embodiment, this embodiment is also directed to a discriminator which forms part of of a demodulator for 64-level QAM system. The FIG. 12 arrangement comprises two full-wave rectifying sections 300 and 302 which are coupled in series, two 1-bit A/D converters 304 and 306, a 2-bit A/D converter 308, and a controller 310. The controller 310 is the same as the controller 108 of FIG. 10. The discriminator of FIG. 12 receives 8-level baseband signals via an input terminal 298. This embodiment is similar to the fifth embodiment (FIG. 10) in configuration and also functions in a manner similar to the FIG. 10 arrangement, so that further description will not be made for simplicity.

The present invention has been discussed with reference to the demodulators for the 16- and 64-value QAM systems, but is not limited thereto. For example, the present invention is applicable to a demodulator of other type multilevel QAM system or a 8-phase PSK (phase shift keying) system wherein the phase differences between the modulated signals are not equal.

The subtracters of FIGS. 3 and 4 can be replaced by adders which are easily realized through the use of differential amplifiers. The FIG. 6 arrangement can be modified as follows: (a) the first output P1 can be derived from the output of the non-inverting amplifier 52, and (b) the second control signal Y is used to control a constant current circuit provided in the amplifiers 52 and 54 as in the arrangement of FIG. 7.

The foregoing description shows only preferred embodiments of the present invention. Various modifications are apparent to those skilled in the art without departing from the scope of the present invention which is only limited by the appended claims.

What is claimed is:

1. A demodulator for a multilevel amplitude modulation system, said demodulator comprising a discriminator which receives demodulated multilevel baseband signals and recovers a plurality of binary digital signals according to a plurality of discriminating levels, said discriminator including:
   a full-wave rectifying section which receives said multilevel baseband signals and produces first and second outputs, said first output being controlled by a first control signal with respect to the DC components thereof, said second output being full-wave rectified and controlled by a second control signal with respect to the DC components thereof;
   an analog-to-digital converting means which receives said first and second outputs and produces the recovered binary digital signals and an error signal; and
   a controller which receives at least one of the recovered binary digital signals and said error signal and which produces said first and second control signals after logic operations.

2. A demodulator as claimed in claim 1, further comprising at least one limiter provided between said controller and said full-wave rectifying section.

3. A demodulator as claimed in claim 1, wherein said full-wave rectifying section comprises:
   a first DC control circuit which receives said multilevel baseband signal and which is controlled by said first conrol signal with respect to the DC components thereof;
   a full-wave rectifier coupled to the output of said first DC control circuit;
   a second DC control circuit which is coupled to said full-wave rectifier and which is controlled by said second control signal with respect to the DC components thereof,
   said first output being derived from said first DC control circuit.

4. A demodulator as claimed in claim 3, wherein each of said first and second DC control circuits is a subtracter.

5. A demodulator as claimed in claim 3, wherein each of said first and second DC control circuits is an adder.

6. A demodulator as claimed in claim 1, wherein said full-wave rectifying section comprises:
   a DC control circuit which receives said multilevel baseband signal and which is controlled by said first control signal with respect to the DC components thereof;
   a non-inverting amplifier coupled to the output of said DC control circuit;
   an inverting amplifier coupled to said non-inverting amplifier in parallel and being coupled to the output of said first DC control circuit;
   a first half-wave rectifier coupled to the output of said non-inverting amplifier;
   a second half-wave rectifier coupled to the output of said inverting amplifier, said first and second half-wave rectifiers operating as a full-wave rectifier in combination and producing said second output;
   wherein the output signals of said non-inverting and inverting amplifiers being controlled simultaneously by said second control signal.

7. A demodultor as claimed in claim 6, wherein said first output is derived from said DC control circuit.

8. A demodulator as claimed in claim 6, wherein said first output is derived from the output of said non-inverting amplifier.

9. A demodulator as claimed in claim 1, wherein said full-wave rectifying section comprises:
   a non-inverting amplifier being adapted to receive said multiple baseband signals;
   an inverting amplifier being adapted to receive said multiple baseband signals;
   a first half-wave rectifier coupled to the output of said non-inverting amplifier;
   a second half-wave rectifier coupled to the output of said inverting amplifier, said first and second half-wave rectifiers operating as a full-wave rectifier in combination and producing said second output;
   wherein the output signals of said non-inverting and inverting amplifiers being controlled simultaneously by said second control signal.

10. A demodulator as claimed in claim 1, wherein said controller comprises:
    a logic circuit for receiving said recovered binary digital signals and said error signal;
    two multivibrators which are controlled by the outputs of said logic circuit; and
    two low-pass filters which receive the outputs of said two multivibrators respectively, and producing said first and second control signals.

11. A demodulator as claimed in claim 10, further comprising two limiters which are provided between said two low-pass filters and said full-wave rectifying section.

* * * * *

UNITED STATES PATENT AND TRADEMARK OFFICE
CERTIFICATE OF CORRECTION

PATENT NO. : 4,553,102
DATED : November 12, 1985
INVENTOR(S) : Yasuharu YOSHIDA

It is certified that error appears in the above-identified patent and that said Letters Patent is hereby corrected as shown below:

Column 7, Line 26, "$(L + L' + M + M') < v$" should read --$(L + L' + M + M') \leq v$--;

Signed and Sealed this

*Fifth* Day of *August 1986*

[SEAL]

*Attest:*

DONALD J. QUIGG

*Attesting Officer*  *Commissioner of Patents and Trademarks*